Figure 1:
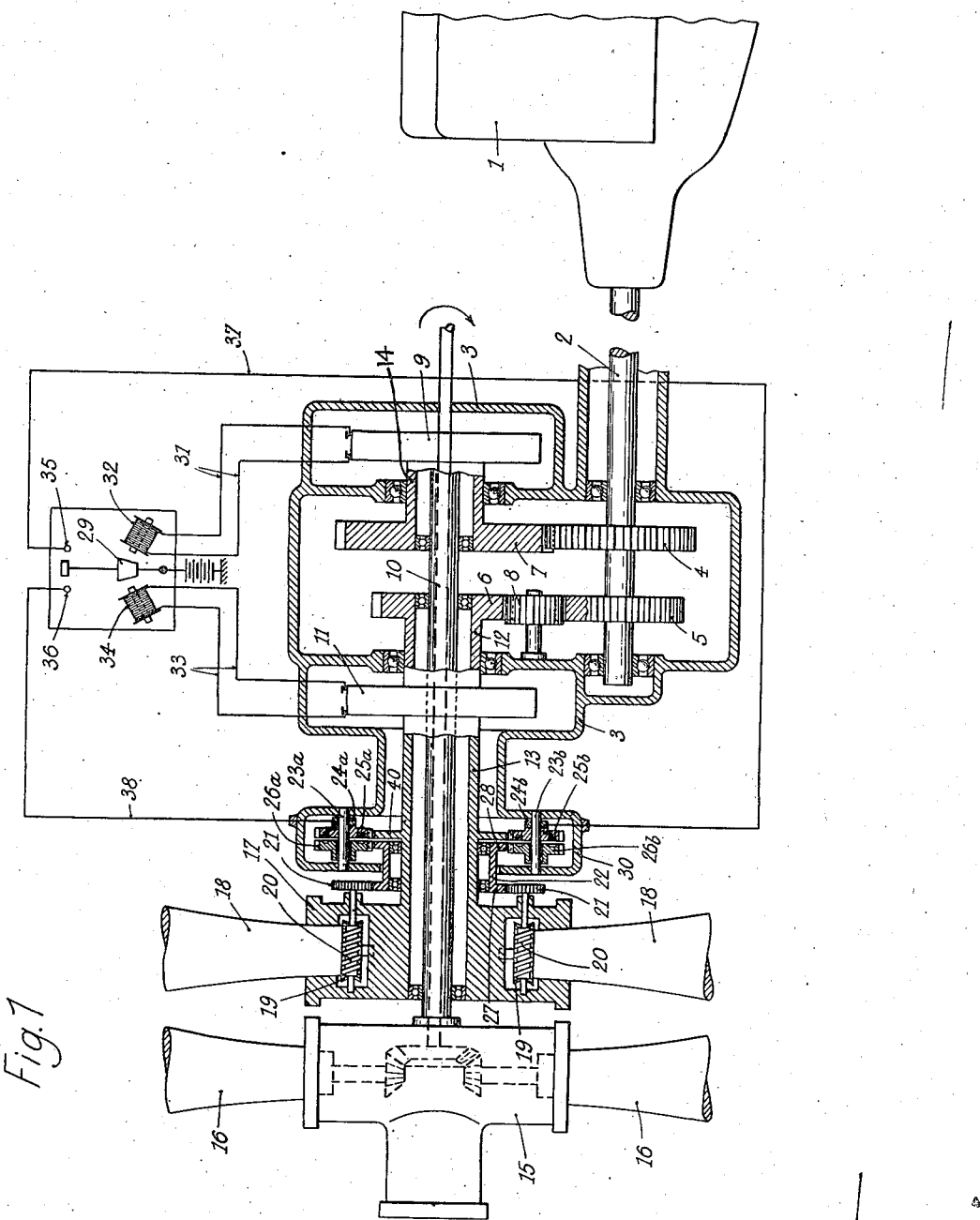

Nov. 30, 1948.                    R. DOUSSAIN                    2,455,239
                DEVICE FOR REGULATING THE PITCH OF TWO
Filed March 8, 1946    COUNTER-ROTATING COAXIAL PROPELLERS
                                                          2 Sheets-Sheet 1

Inventor;
Robert Doussain
By Singer, Ehlert, Stern
+ Carlberg, attorneys

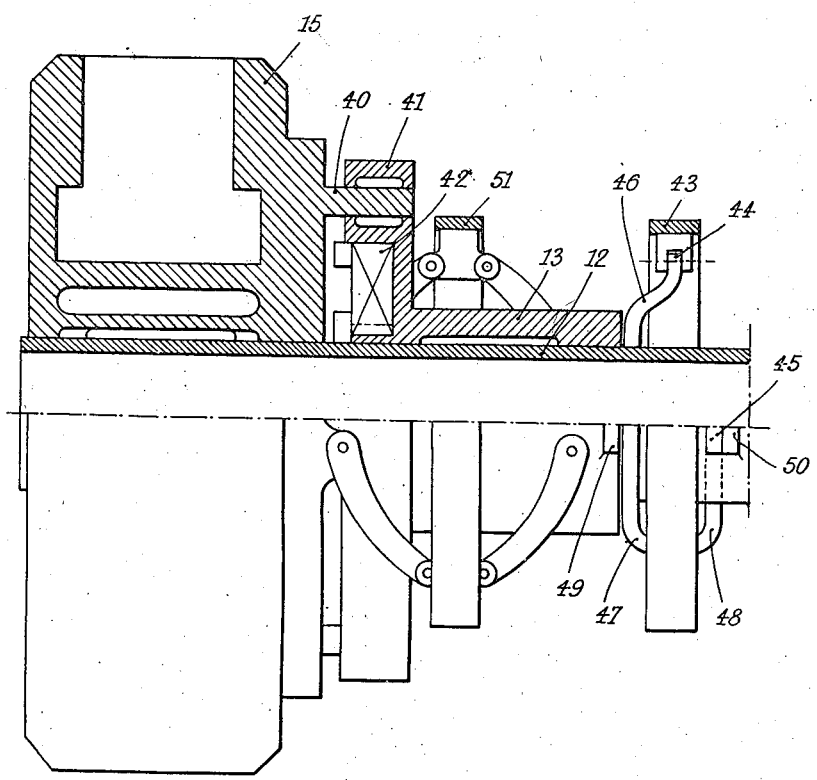

Patented Nov. 30, 1948

2,455,239

UNITED STATES PATENT OFFICE 2,455,239

DEVICE FOR REGULATING THE PITCH OF TWO COUNTERROTATING COAXIAL PROPELLERS

Robert Doussain, Villerubane, France

Application March 8, 1946, Serial No. 653,197
In France March 27, 1942

2 Claims. (Cl. 170—135.6)

The present invention applies to systems of two coaxial propellers coupled mechanically so as to rotate in opposite directions. The utilization of these systems, chiefly in airplanes, presents advantages such as the compensation of the reactionary torque and the possibility of absorption of the high engine ratings.

In practice, the use of co-axial propellers with a constant pitch is out of the question and consequently the regulation of the pitch of two coaxial propellers presents a problem which has not yet received a satisfactory solution.

Three cases are to be considered:

1. When the two propellers are driven by independent engines.
2. When the two propellers are interconnected by mechanical means such as a differential, so that the ratio between the rotation speeds of the propellers is dependent upon the torque ratio.
3. When the two propellers are connected by mechanical means so that they will counter-rotate at the same speed.

Whatever the adopted mounting, it must satisfy the condition, that the torques absorbed by the propellers must be always equal.

The first solution necessitates somewhat complicated conditions of use, as it is necessary to utilize independently controlled pitches, each of them being operated by a speed governor driven by the corresponding engine, and as it is necessary that both engines should rotate at the same speed and should have the same power ratings.

In the second solution, if the two propellers are forced to rotate at the same speed, absorption of the same torque by each of them will be necessarily obtained. But this system which necessitates a speed governor mounted on each engine shaft and a double relay submitted to the action of these regulators is of a mechanical complication and fragility making its use difficult more particularly when high power ratings are used.

According to the present invention, the third solution which consists in connecting mechanically the two propellers so as to have them rotating at the same speed will be adopted. Such synchronization devices are of a simple construction and of a reliable operation. The devices for regulating the pitch of the two propellers must then be controlled in a way that will comply with the above mentioned conditions, that is the absorption of the same torque by each propeller.

A manual control operated by the pilot could be considered, but in that case the pilot should be provided with measuring instruments which are not usually included on board of aircraft, and anyhow the operation would not be automatic. An independent automatic control for the pitch of each propeller could also be considered in view of complying with the above mentioned condition, but difficulties encountered in the construction prevented this solution from being adopted.

According to the essential feature of the present invention, the shafts of the two propellers are provided with elastic devices, mounted so as to actuate, by any appropriate means as for instance an electrical relay, the device for controlling the pitch of one of the propellers; the other propeller having its pitch controlled in an independent way either manually or automatically relatively to any appropriate factor so that when the pitch of the last mentioned propeller is changed, the pitch of the first mentioned propeller changes automatically, in such a manner that the torques absorbed by the two propellers remain always equal.

The description that follows along with the hereto annexed drawings given as an example will easily explain the way to realize the present invention.

On these drawings:

Fig. 1 is a schematic view of a system of counter-rotating co-axial propellers established in conformity with the invention, Fig. 2 is a detailed view, partly in section, of the pitch control arrangement of Fig. 1.

In the form of construction shown the two propellers are driven by the same motor 1. The shaft 2 of this motor is studded on a frame 3 and bears the gear wheels 4 and 5. The gear wheel 4 is in mesh with a tooth wheel 7, the latter being integrant part of a hollow shaft 14 which drives the propeller shaft 10 by means of an elastic coupling device 9 interposed between this hollow shaft 14 and the propeller shaft 10.

In a similar way the gear wheel 5 meshes with a gear wheel 6 forming a part of a hollow shaft 12 driving by means of a second elastic coupling 11 another hollow shaft 13 which constitutes the second propeller bearing shaft. The gear wheel 8 inverses the rotation so that the shaft 10 and the shaft 13 rotate in opposite directions with a constant driving ratio.

The two synchronized propellers may be driven also by two motors, of which the second motor drives for instance the gears 6 by means of an appropriate gear device.

The shaft 10 bears the hub 15 of one propeller 16, similarly the shaft 13 bears the hub 17 of the other propeller 18. The hub 15 includes a device for changing the pitch of the propeller 16 which may be of any appropriate type and may be controlled as required or else by hand or automatically relatively to any factor (speed of the engine, etc.).

The hub 17 of the propeller 18 is also provided with a device for control of the pitch which is constituted as follows:

Each propeller blade is provided with a worm wheel 19 in mesh with a worm 20. Each worm 20 bears on its shaft a gear wheel 21 in mesh with the teeth 27 of a double row of teeth ring 22 having the same axes as the shafts 10 and 13.

The other row of teeth 28 of this ring 22 is in mesh with two pinions 26a and 26b mounted loose on the shafts 23a and 23b which are fixed in a shaft box 30 constituted by the left end of the frame 3. These pinions 26a and 26b may be coupled by means of an electromagnetic clutch device, of the gear wheels 25a and 25b also rotating on the shafts 23a and 23b. These pinions 25a and 25b are always in mesh with a tooth wheel 40 which is part of the shaft 13. The pinion 26a has a number of teeth slightly different from that of the wheel 25a. For instance the pinion 26a has one more tooth than the pinion 25a. Inversely, the pinion 26b has for instance one tooth less than the pinion 25b. The teeth of the pinions 26a and 26b are cut in such a way as to allow them to mesh with the teeth 28 of the ring 22 although their number is different.

The electromagnetic clutch devices 25a and 25b are actuated by the deformation of the elastic coupling devices 9 and 11 through the intermediacies of a differential relay 32—34. This relay comprises a lever 29 submitted to the action of the electromagnets 32 and 34 cooperating with two contact elements 35 and 36 in such a manner that one or the other of these contact elements can be connected to a source of electric current by this lever according to its angular position. The contacts 35 and 36 are electrically connected by conductors 37 and 38 to rings 24a and 24b which are supported by the washers 24b and 24a, and connected to the windings of the electromagnetic clutch members 25a and 25b.

The elastic coupling device 11 comprises (Fig. 2) an elastic deformable ring 43 provided with two diametrically opposed thrust bearings 44 on which two pairs of connecting rods 45, 46, 47 and 48 are pivotally attached. The connecting rods 46 and 47 are pivoted to diametrically opposed wings 49 of the shaft 13 and the connecting rods 45 and 48 are pivoted to diametrically opposed wings on shaft 12. The elastic coupling device 9 is of similar construction.

The tangential forces corresponding to the torque transmitted between the shafts 12 and 13 are transformed in diametrical forces bearing on the deformable ring 43 and causing deformations of this ring which are utilized for operating the differential relay 32—34.

This system works as follows:

As long as the torques acting on the coupling devices 9 and 11 are equal, the electric currents in the circuits 31 and 33 are also equal and the magnets 32 and 34 exert equal and opposed stresses on the lever 29 and the latter remains in the neutral position. As long as these conditions prevail the system remains unchanged.

If now for any reason, for instance as the result of the change in the pitch of the propeller 16 the torques transmitted by the coupling devices 9 and 11 cease to be equal, one of the electromagnets 32 and 34 will exert a stronger action on lever 29 than the other and will cause this lever to swing in one or the other direction in order to engage it with either one of the contact elements 35 and 36. One of the electric circuits 37 and 38 is thereby closed and energizes the winding of one of the electromagnetic clutch members 25a and 25b. If lever 29 is opposed to come into engagement with the contact element 36 so as to close the circuit 38, then the electromagnetic connection between pinions 25a and 26a is obtained. If pinion 26a has, for instance, one more tooth than 25a it compels the ring 22 to rotate at a speed slightly lower than that of the hollow shaft 13. As a result the gear wheels 21 rotate around their respective axes and produce by means of the worm 20, which drives the worm wheel 19, a rotation of the propeller blades 18 around their axes. The pitch of the propeller 18 is modified until the torque absorbed by this propeller becomes equal to the one absorbed by the propeller 16. The units 9 and 11 produce then equal currents in the circuits 31 and 33, bringing the lever 29 back in its neutral position, cutting the circuit 38, desolidarizing the pinion 26a from the gear wheel 25a and stopping the rotation of the wheels 21 around their axis. The propeller blade 18 stays with the pitch it had at this moment.

It was understood that the modification in the pitch resulting from the use of the pinion 25a was made in a way that produces the desired correction, for instance an increase in the pitch. If the difference between the torques measured by the devices 9 and 11 was in the opposite direction, the lever 29 would come over the contact 35 and close the circuit 37, thus actuating the electromagnetic clutch 25b and 26b and producing, by means of the pinion 26b, a relative increase of speed in the movement of the ring 22 corresponding to a rotation of the wheels 21 around their respective axis in the opposite way of the one already described.

It is understood that the above described embodiment of the invention may also be applied to stationary propellers employed for instance in blowers.

What I claim is:

1. In a system for regulating automatically the pitch of one of two co-axial propellers coupled mechanically so as to rotate in opposite directions, a drive shaft, an electrical differential relay, a first driven propeller shaft driven through the intermediate of an elastic device acting on said differential relay, a second propeller shaft driven through the intermediate of a second elastic device acting on said differential relay, a pitch control device for one of said propellers, an electromagnetic clutch arrangement provided between said pitch control device and one of said propeller shafts and controlled by said differential relay, said pitch control device being regulated by the deformations of said elastic devices by means of said differential relay in function of the transmitted torque, and a further pitch control device for the other propeller regulated in an independent way, so that when the pitch of the last-mentioned propeller is varied, the pitch of the first-mentioned propeller varies accordingly and automatically in such a manner that the torques absorbed by the two propellers remain always equal.

2. In a system of the character described, a drive shaft, an electrical differential relay including two electromagnets, a first propeller shaft driven through the intermediate of an elastic deformable ring acting on one of said electromagnets, a second propeller shaft driven through the intermediate of a second elastic deformable ring acting on the other electromagnet, a blade pitch control device for one of said propellers actuated by one of said propeller shafts through the intermediate of an electromagnetic clutch arrangement comprising pinions meshing with a gear wheel keyed on the last-mentioned propeller shaft, provided with windings and cooperating with clutch pinion members in mesh with a pitch controlling gear wheel provided on a sleeve surrounding the said propeller shafts, said windings being connected, respectively, to said electromagnets of the differential relay so as to permit the regulation of said blade pitch control device by the deformations of said elastic deformable rings in function of the transmitted torque, and a further blade pitch control device for the other propeller regulated in an independent way, so that when the blade pitch of the last mentioned propeller is varied, the pitch of the first-mentioned propeller varies accordingly and automatically in such a manner that the torques absorbed by the two propellers remain always equal.

ROBERT DOUSSAIN.

REFERENCES CITED

The following references are of record in the file of this patent:

UNITED STATES PATENTS

| Number | Name | Date |
|---|---|---|
| 2,216,013 | Kenney | Sept. 24, 1940 |
| 2,392,556 | Seppeler | Jan. 8, 1946 |
| 2,416,662 | Lundquist | Feb. 25, 1947 |
| 2,426,007 | Forsyth | Aug. 19, 1947 |

FOREIGN PATENTS

| Number | Country | Date |
|---|---|---|
| 826,904 | France | Jan. 18, 1938 |